United States Patent [19]

van den Broek

[11] 3,933,129

[45] Jan. 20, 1976

[54] COMBINED LIQUID FILTERING AND HEATING APPARATUS

[75] Inventor: William A. van den Broek, Doylestown, Pa.

[73] Assignee: KDI-Sylvan Pools, Inc., Doylestown, Pa.

[22] Filed: Mar. 6, 1975

[21] Appl. No.: 556,033

[52] U.S. Cl. .................... 122/156; 122/18; 122/37
[51] Int. Cl.² ..................... F22B 7/00; F22B 33/06
[58] Field of Search ................ 122/18, 37, 155, 156

[56] References Cited
UNITED STATES PATENTS

| | | | |
|---|---|---|---|
| 2,048,393 | 7/1936 | Kroger | 122/37 |
| 2,198,310 | 4/1940 | Kroger | 122/37 |
| 3,139,067 | 6/1964 | van den Broek et al. | 122/18 |
| 3,363,766 | 1/1968 | van den Broek et al. | 122/18 X |
| 3,386,419 | 6/1968 | van den Broek | 122/18 |

Primary Examiner—Kenneth W. Sprague
Attorney, Agent, or Firm—Sughrue, Rothwell, Mion, Zinn & Macpeak

[57] ABSTRACT

A combined liquid filtering and heating apparatus comprises a cylindrical filter section coaxially mounted on top of a water-jacketed combustion chamber section. Cold unfiltered water is fed through the filter section and a portion of the feed is directed through and is heated in the jacket. The feed water passing through the filter is heated to a lesser extent than the water passing through the jacket by heat transfer from the combustion chamber and a plurality of flues extending from the combustion chamber through the filter section. The filter medium may be sand, cartridges, bags or the like.

8 Claims, 9 Drawing Figures

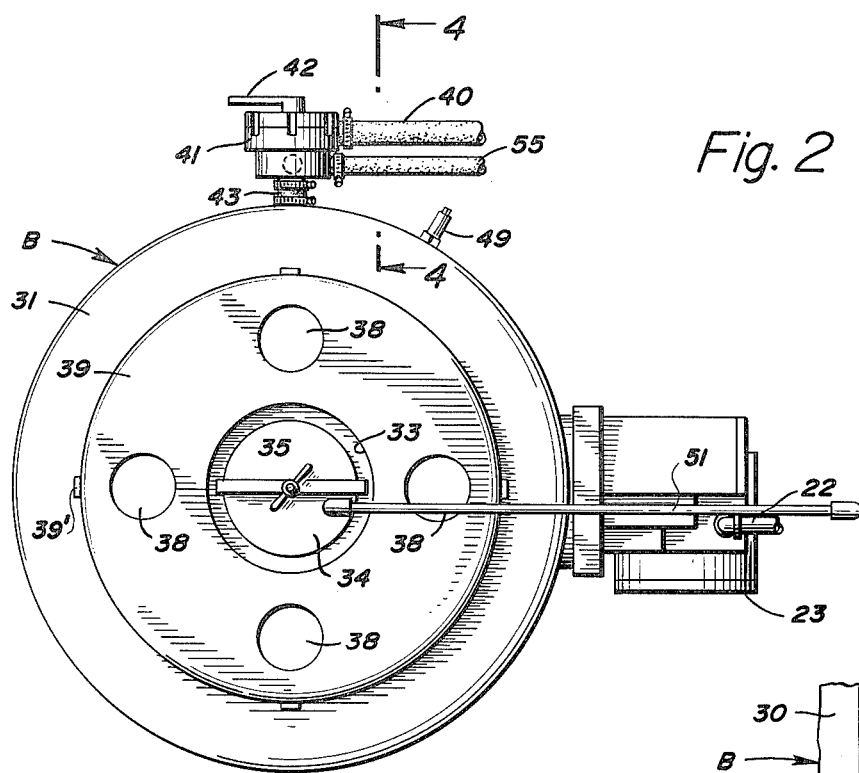
Fig. 2
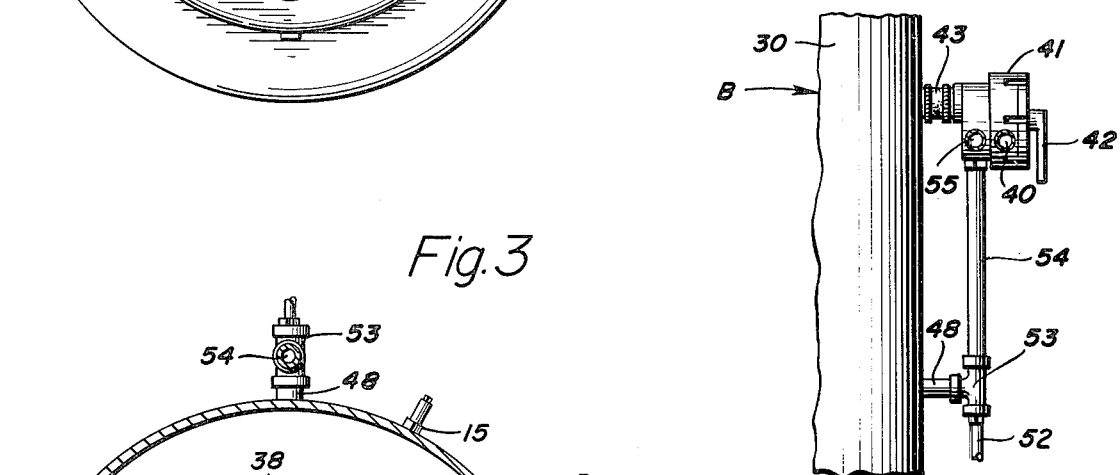
Fig. 3
Fig. 4
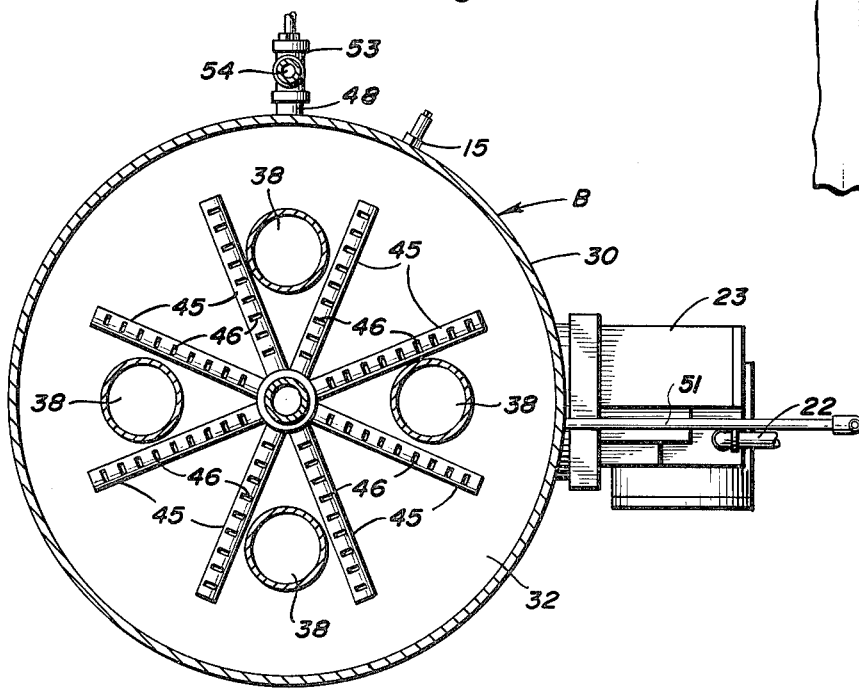

COMBINED LIQUID FILTERING AND HEATING APPARATUS

BACKGROUND OF THE INVENTION

1. Field of the Invention

This invention pertains to liquid filtering and heating apparatus. More particularly, it relates to liquid filter-heater combinations which have particular utility in connection with the operation of swimming pools.

2. Prior Art

Swimming pools, of the type wherein the same water is recirculated, have long had associated with them filtration apparatus for removing solid impurities from the water. It has also been customary to heat swimming pool water in those installations where it is desired to extend the length of the swimming season. Such heating would seek, for example, to raise the temperature of the swimming pool water from an ambient of 76°F to a desired temperature of 82°F. Most usually, the heating is achieved with a water heater generally resembling a domestic hot water heater.

More recently, it has been recognized that economies in initial equipment cost and subsequent operating expenses may be realized by combining a filter with a heater to produce what may be termed a filter-heater combination. Such apparatus is shown in my own prior U.S. Pat. Nos. 3,139,067 and 3,386,419 granted, respectively, on June 30, 1964 and June 4, 1968.

However, combined units of this type have their own particular problems. Since they are frequently located proximate swimming pools, as distinguished from in locked boiler rooms, it is important that they not present a hazard by virtue of hot external surfaces or high temperature gas emissions. While the unit can be protectively housed, this adds nothing but expense. Another problem has to do with condensation and consequent corrosion within the combustion chamber which is the natural result of having cold surfaces therein. Finally, if heat transfer is to be effected via heat exchangers (e.g. coils, fin-tubes and the like) these represent elements which are subject to clogging because of salt deposition and require periodic maintenance and replacement.

SUMMARY OF THE INVENTION

Briefly summarized, the instant invention is a combined liquid filtering and heating apparatus which overcomes the deficiencies of the prior art. It comprises a cylindrical combustion chamber which is water jacketed. The jacket forms a natural insulator and causes the ambient temperatures present at its exterior to be safe to the touch. Furthermore, because the water in the jacket is warm, the internal surfaces within the combustion chamber do not permit the formation of condensate. Although the water circulated through the combustion chamber water jacket constitutes only a small percentage of the total water being recirculated, the principal percentage of heat transfer takes place in the water-jacket as opposed to that taking place in the filter section. The filter section is mounted coaxially on the combustion chamber.

In one embodiment of the present invention, all of the water coming from the pool or other water source enters the filter section but a small portion of it, on the order of magnitude of 5%, passes through a bleed line directly to the jacket without being filtered. The balance of the water passes through the filter medium. A plurality of flues extend longitudinally upward through the filter section and the heat from the combustion gases passes through the flue walls to heat the water being filtered. Gases leaving the unit are at a safe low temperature, having surrendered their sensible heat to the water in the filter section of the unit. Additionally, heat enters the filter section through the bottom thereof, which also serves as the top of the combustion chamber. Heating of the water is thus accomplished without the use of the heat exchange elements of the prior art by means of a simple and fool-proof construction.

In a second embodiment of the present invention, all of the water taken from the pool is passed through the filter section. Subsequently a portion of the filtered heated water is directed through the water-jacket surrounding the combustion chamber wherein additional heat transfer to the water takes place prior to returning the water to the pool.

Accordingly, it is an object of the invention to provide a combined liquid filter and heater wherein the combustion gases are cooled before leaving the unit and surrender their heat within the confines of the filter.

An additional object of the invention is to provide a liquid filter and heater combination having a combustion chamber which is water-jacketed, said jacket being utilized for heat transfer into the circulating water and, by virtue of the temperature of the water therein, preventing condensation within the chamber.

Other objects of the invention are to provide an improved filter-heater combination which is sturdy in construction, inexpensive to produce, has a low operating and maintenance cost, is highly efficient in operation and has external surfaces which are at low temperatures and, therefore, present a minimal safety hazard.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 2 is a top plan view of the apparatus of FIG. 1.

FIG. 3 is a sectional view taken on line 3—3 of FIG. 1.

FIG. 4 is a fragmentary sectional view taken on line 4—4 of FIG. 2.

DETAILED DESCRIPTION OF THE INVENTION

Figure 1:
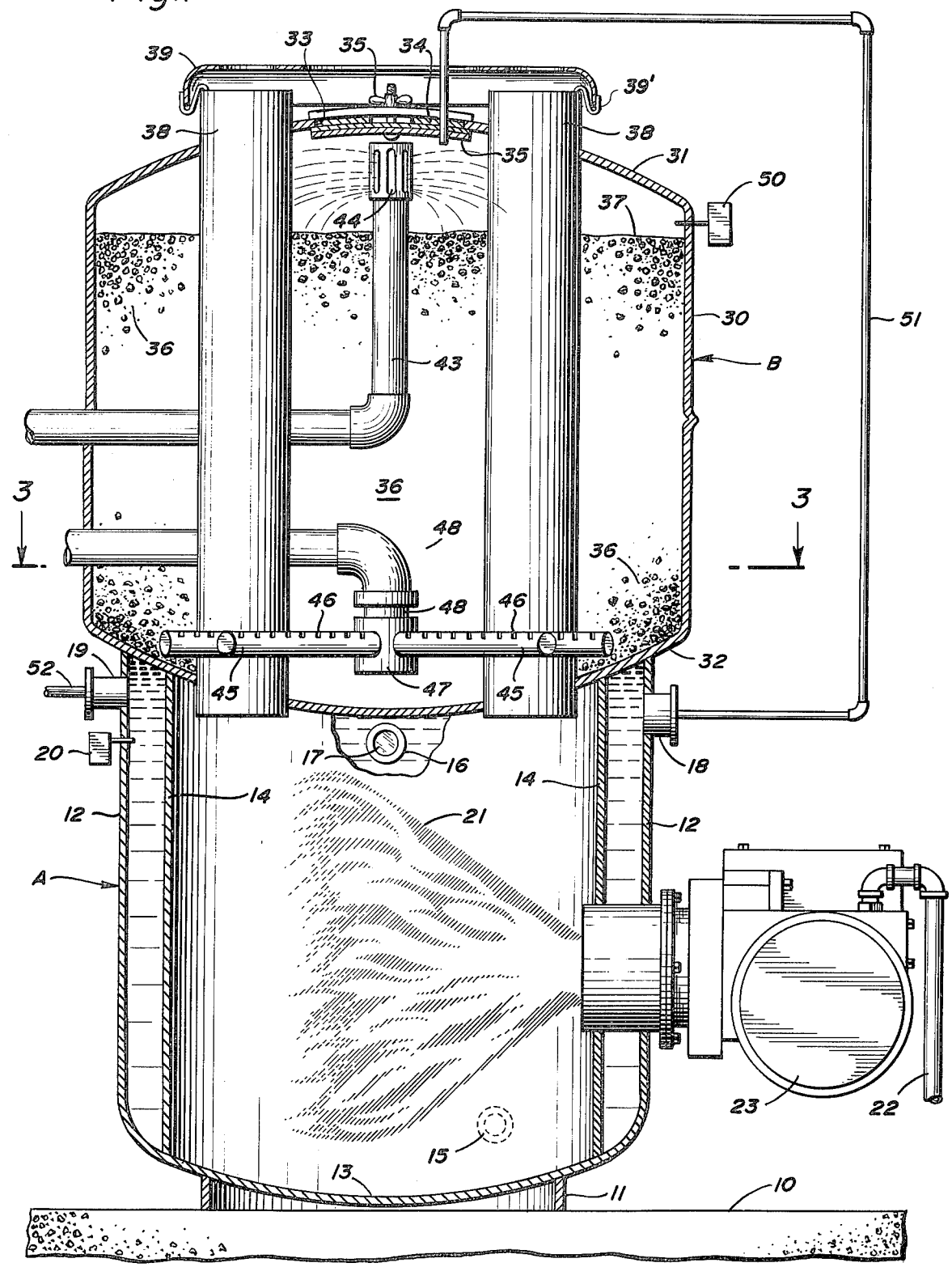
FIG. 1 is a vertical elevational view, partly in section, taken through a combined filtering and heating apparatus according to a first embodiment of the invention.

In the first embodiment of FIGS. 1–4 the apparatus comprises a combustion chamber section A upon which is mounted a filter section B adapted to contain a particulate filter medium (e.g. sand).

The apparatus may be mounted on compacted earth or, preferably, a concrete pad 10, by utilization of adjustable legs, a leveling ring 11 or the like. Combustion chamber A may be characterized as a hollow cylinder and includes an outer wall 12 terminating in a dished bottom 13 which sits upon and is supported upon ring 11. Inner wall 14 is concentric with and spaced from outer wall 12 and terminates at the dished bottom 13. The annular space between walls 12 and 14 constitutes a water-jacket. Various materials of construction may be used for the chamber including carbon steel, "glass" lined steel and stainless steel.

The water-jacket is provided with a drain 15 and a peep hole 16, suitably faced with fireproof transparent material (e.g. mica) 17, which extends to the interior of the chamber so that the flame may be viewed for adjustment. Water enters the annular jacket via inlet 18 and leaves via outlet 19. Mounted on the jacket, proximate outlet 19, is a high temperature limit control 20 which senses outlet water temperature and provides a control signal to the burner.

The burner, generally indicated at 23, is mounted on the combustion chamber and projects its flame 21 into the interior thereof. Natural gas, propane and oil are among the preferred fuels. While a power gas burner may be used, a gun type oil burner is illustrated with oil being supplied to it via conduit 22. Conventional controls are used for such burners including the previously mentioned high temperature limit control 20.

Filter section B is a generally cylindrical vessel including sidewall 30, a dished head 31 and a dished bottom 32. This vessel may be made of stainless steel, "glass" lined steel or any material which will resist corrosion and provide sufficient strength. The filter is coaxially mounted on chamber A and dished bottom 32 serves, in effect, as the top of the combustion chamber and the water-jacket. Access to the interior of the filter section is through a hand-hole 33 having a removable cover plate 34 kept in place with a clamp assembly 35. The filter contains a particulate filter medium 36 such as, for example, sand, a graded mixture of sand and gravel or anthracene. The top of the filter medium is indicated by the numeral 37.

Passing longitudinally through filter section B, from dished bottom 32 to dished head 31 are a plurality of flues 38 which are tubular and may be circular in cross-section, as shown. These conduct combustion gases from chamber A to the atmosphere and their walls also act as heat exchange surfaces for conducting heat from the combustion gases to the water which, during operation, fills filter section B. The tops of the flues are capped by a draft hood 39 supported by hooks 39' to prevent back drafts and limit access to the tops of the flues.

All liquid enters the apparatus via an inlet conduit 40 which connects to a conventional multi-port valve 41 operated by a handle 42. Onstream flow is from the valve, via cold water inlet conduit 43 to liquid distributing means, such as a spray head 44, located within the filter section B proximate its top. Liquid will fill the entire filter section B and passes downward through the filter medium 36 to liquid collecting means located within the filter proximate its bottom. These means are exemplified by a plurality of tubes 45 each of which contains a plurality of foramina 46. Tubes 45 are mounted in and extend radially from a hub 47 which, in turn, is linked to and dependently supported from a filtered warm water outlet conduit 48. The body of still water beneath tubes 45 serves to keep the surface of bottom 32 which is within the combustion chamber warm and thus prevents formation of condensate as would be the case were cold water to reach the bottom of the filter.

The shell of filter section B is also provided with a drain 49 and a thermostatic burner controller (e.g. Aquastat) 50 located proximate the water inlet level to sense the temperature of the incoming water.

In this embodiment conduit 51 links the top of filter section B with jacket inlet 18 to provide a supply of water to the jacket. Heated water leaves the jacket of combustion chamber A via outlet 19 and flows, via conduit 52, to a "T" 53 where this fluid joins filtered water leaving the filter section via outlet 48. The merged water flows through a mixing riser 54 back to valve 41 and thence, via return line 55, back to the source of the water such as a swimming pool. Conventional components such as a pump, sewage connection and fresh water source (for backwashing the filter) have not been shown since they form no part of the invention.

In typical operation of the filter-heater, the controller 50 is set for a temperature of 82°F which represents the desired temperature of the pool water. The controls of the burner (which, typically, has a rating of 200,000 BTU/hr) are arranged so that as long as the unit is turned on and the temperature sensed by controller 50 is less than the set temperature of 82°F, the burner will operate (assuming ignition and fuel feed are proper). When the set temperature has been reached or exceeded, the unit will shut down and will recycle when the temperature drops. However, high temperature controller 20 which is set at between 120° and 130°F and is wired in series with controller 50 can also cause a complete shut down at any time if the temperature in the jacket exceeds the set point. This would happen, for example, were the pump to fail.

It is assumed for purposes of illustrating the thermodynamics of the apparatus that water from the pool enters inlet 43 at a temperature of 76°F and a rate of 58 g.p.m. All of the entering water is distributed by head 44 and fills the totality of filter section B. There is no air pocket at the top because conduit 51 removes a continuous stream of unfiltered and substantially unheated water. There is, of course, heat transfer via the walls of flues 38. This heats the water and cools the combustion gases so that the gases are discharged at a relatively low temperature. There is also heat transfer to the water within filter section B through dished bottom 32. However, unlike prior art units, significant heat transfer occurs in the jacket of combustion chamber A. Ideally, about 60% of total heat transfer occurs in the combustion chamber and 40% in the filter section.

The unit is designed so that about 95% to 98% of the water entering the unit flows down through the filter medium while from about 2% to about 5% flows through the by-pass conduit 51. The conduit shown is external but it may also be contained within the shell of the filter. In the typical operation being described, 3 gallons per minute of the entering 58 gallons (about 5.2%) flow through the by-pass whereas 55 gallons (about 94.8%) flow through the filter medium. The water flowing through the filter experiences a temperature rise of about 2° to 78°F whereas the water flowing through the jacket experiences a 30° rise from 76° to 106°F. After they have passed through the mixing riser 54, these combined waters give 58 g.p.m. of water for return to the pool at a temperature of 82°F, the set point of controller 50. Of the 58 gallons, 55 have been filtered and heated whereas 3 gallons have been heated but not filtered.

This mode of operation avoids prior art problems of condensation on the interior walls of the combustion chamber since the temperature of the walls is always above the dew point. The location of the inlet and outlet, both near the top, assures that there will always be warm water in the jacket when the flame cuts out. The same is true of the layer of stagnant water in the filter section proximate bottom 32. Furthermore, the jacket carries a significant share of the heat transfer load obviating the need for reliance upon internal heat exchange units such as coils, which increase both initial cost and subsequent maintenance problems.

The performance described above is achieved with minimum cost since a unit capable of these empirical results need be but 48 inches high with a combustion chamber 18 inches O.D. and a filter 24 inches O.D. Larger flow rates, of course, require larger units. However, the operation described (i.e. 58 g.p.m. circulation) is adequate for pools having about 700 square feet of surface area where a 20°F rise in water temperature is sought as a design criteria.

Figure 6:
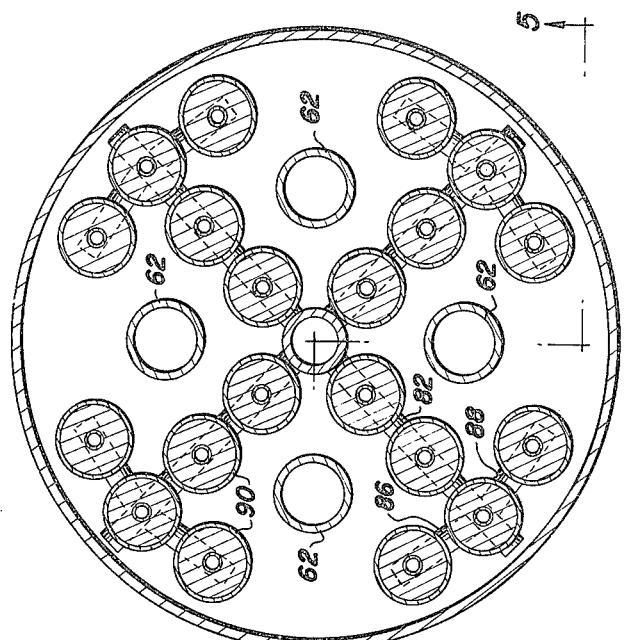
FIG. 6 is a sectional view taken along the line 6—6 of FIG. 5.
Figure 8:
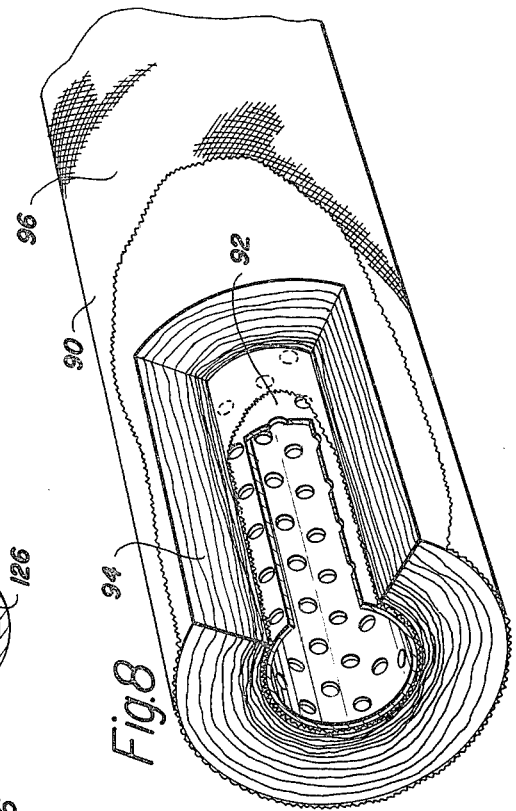
FIG. 8 is a perspective view, partly broken away of a filter cartridge of the type used in FIGS. 5 and 6.
Figure 7:
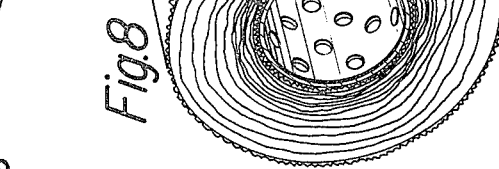
FIG. 7 is a sectional view taken along the line 7—7 of FIG. 5.
Figure 5:
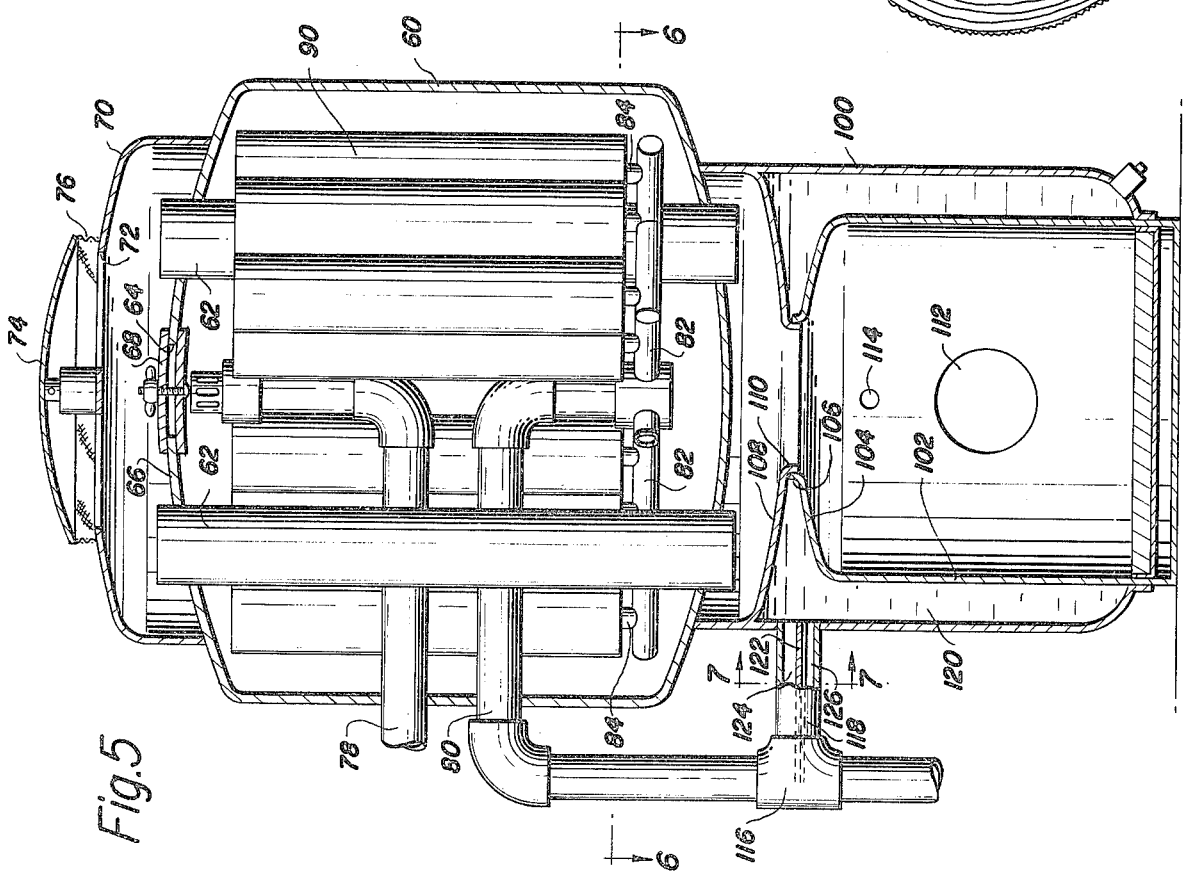
FIG. 5 is a vertical elevational view, partly in section, of a second embodiment of the invention.

In a second embodiment of the invention as shown in FIG. 5, the filter medium has been changed from particulate material to filter cartridges and the construction of the water-jacket combustion chamber along with the feed therefor has been modified. The filter section 60 is substantially identical to the filter section B in the previous embodiment and the flue pipes 62 extend therethrough in substantially the same manner. An access hole 64 is provided in the top 66 of the filter section 60 and a removable cover plate 68 is provided. A flange 70 connected to the filter section 60 surrounds the tops of the flue pipes 62 to provide a vent space and the central opening of the flange 70 is closed by means of a detachable cover 74 having a perforated rim 76 to allow for the escape of exhaust gases. The inlet and outlet conduits 78 and 80 are arranged similar to the inlet and outlet conduits 43 and 48 in the previous embodiment. However, the radially extending water collecting arms 82 are provided with a plurality of upwardly extending fittings 84 which are hollow and disposed in communication with the interior of the collector conduit 82. In order to provide for a greater number of filter cartridges a pair of branch conduits 86 and 88 are provided at the end of each conduit 82. As best shown in FIG. 6 three filter cartridges are mounted on each conduit 82 and a single filter cartridge is mounted on each branch 86 and 88. The filter cartridges 90 are all identical and may be constructed as shown in FIG. 8. The cartridge 90 is constructed with a perforated polypropylene reinforcing core 92 surrounded by an inorganic glass fiber filter medium 94 bound with a phenolic resin and held in place by means of a polypropylene sleeve 96. The cartridge shown in FIG. 8 is the Aqua-Cel$^{tm}$ filter cartridge of Johns-Manville. However, any other suitable cartridge which is adapted to be mounted on the fittings 84 could readily be substituted.

The water-jacket combustion chamber 100 is provided with an inner wall 102 having an inwardly extending flange 104 terminating in a central upwardly extending flange 106. The concave top member 108 is connected to the outer wall of the chamber 100 and is also provided with a central annular flange 110 which is welded to the flange 106 to provide a water-jacket having a much larger heat exchange surface than the arrangement of FIG. 1. The chamber 100 is provided with aperture 112 for the reception of a burner unit and an aperture 114 for a sight glass similar to that disclosed in the previous embodiment.

The outlet conduit 80 is connected to a T-shaped fitting 116 and a single conduit 118 connects the fitting 116 with the water-jacket 120. A transverse divider plate 122 is secured within the conduit 118 and extends part way into the conduit 80 so that a portion of the filter water coming from the filter section 60 is diverted into the water-jacket 120 through the upper half 124 of the conduit 118. The water is returned from the water-jacket 120 to the conduit 80 through the lower half 126 of the conduit 118.

In the operation of the embodiment shown in FIGS. 5–8 all of the water taken from the pool through the conduit 78 passes through the filter unit and the temperature thereof is initially raised by a first increment due to the heat imparted to the water through the bottom of the filter section 60 and through the flue pipes 62. The temperature of the water which is diverted through the water-jacket 120 is raised again by increment substantially greater than the first increment and upon being returned to the conduit 80 mixes with the filter water to raise the overall temperature thereof. The flow volumes and temperature changes for this embodiment are substantially identical to those set forth with respect to the previous embodiment with the primary difference being that the entire amount of water being recirculated from the swimming pool is filtered whereas in the previous embodiment a small percentage of the water bypassed the filter medium.

Figure 9:
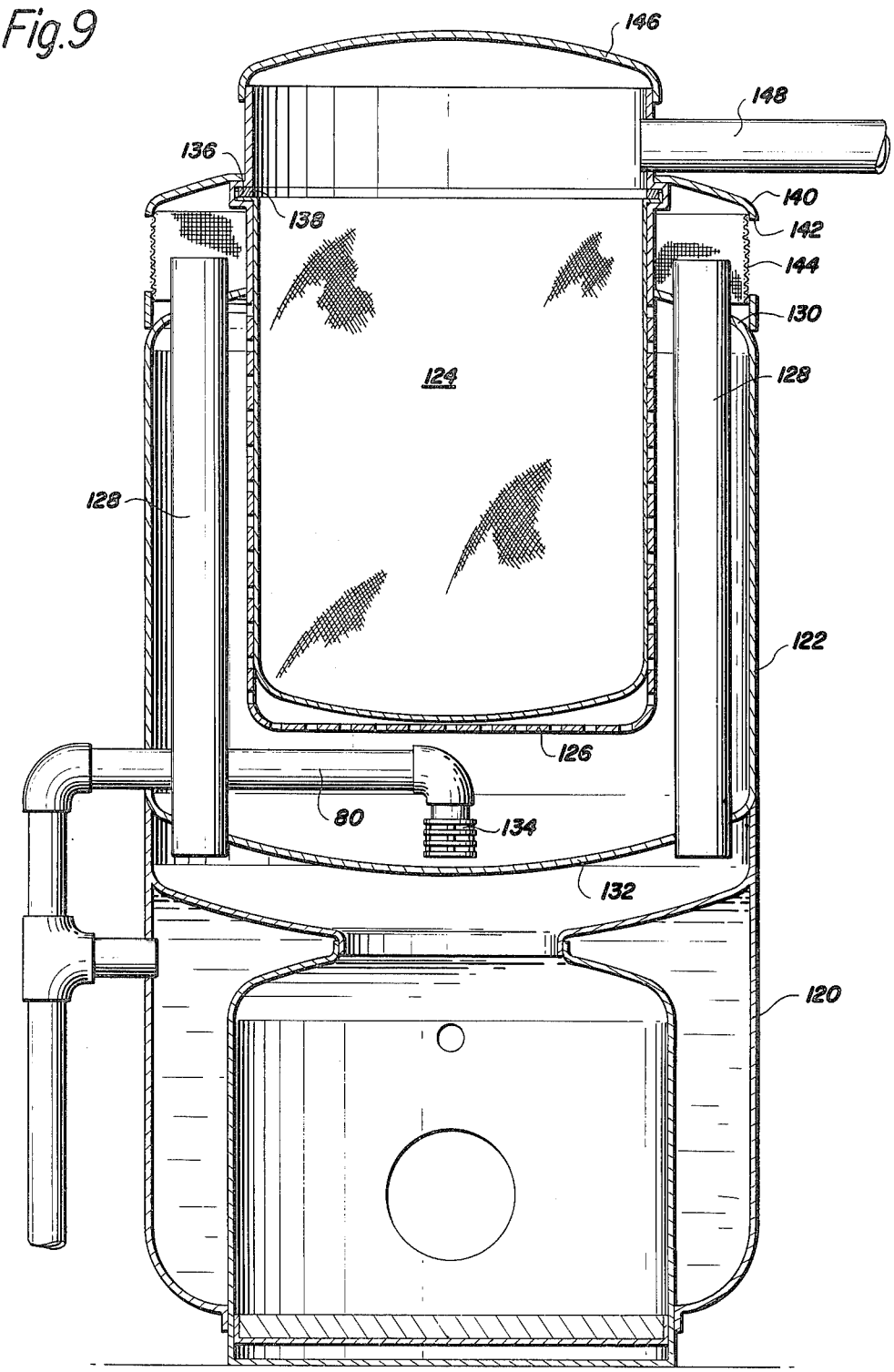
FIG. 9 is a vertical elevational view, partly in section, of a third embodiment of the present invention.

In the third embodiment shown in FIG. 9 a single filter bag is utilized instead of the particulate filter medium of the first embodiment or the plurality of filter cartridges of the second embodiment.

In this embodiment the water-jacket combustion chamber 120 is identical to that disclosed in the second embodiment and the piping connection for diverting a portion of the filter water through the water-jacket are also the same. However, the filter section 122 is substantially reduced in diameter from the previous embodiments and is preferably constructed with the same diameter as the combustion chamber 120. This is made possible by the use of a single filter bag 124 which is disposed in a substantially cylindrical basket 126 concentrically disposed within the filter section 122. The flue pipes 128 extends through the top and bottom 130 and 132 of the filter section 122 in the same manner as in the previous embodiments to impart heat to the water. A simple intake nozzle 134 having suitable screen means is connected to the outlet conduit 80 in lieu of the previous water collecting arrangement. The perforated basket 126 is secured to the top 130 of the filter section 122 by any suitable means such as welding or the like. A portion of the basket 126 extends above the top 130 and is formed with a groove 136 for the reception of a snap ring 138 of any suitable material to secure the uppermost edge of the filter bag 124 in position relative to the basket 126. A flange 140 is secured to the uppermost portion of the basket 126 and extends outwardly over the upper end of the fluid pipes 128. An annular opening 142 covered by a suitable screening 144 is provided between the flange 140 and the uppermost end of the filter section 122 to allow for the escape of the combustion gases. The top end of the filter basket 126 is provided with a suitable cover 146. The water inlet pipe 148 extends through the uppermost portion of the basket wall so that all of the water taken from the swimming pool or the like will pass through the filter bag as in the previous embodiments and be partially heated due to heat transfer from the flue pipes 128 and through the bottom wall 132. A portion of the filter water will then be diverted through the water-jacket surrounding the combustion chamber as in the previous embodiment to increase the temperature of the water.

The filter bag may be constructed from any suitable material and several bags of this type are currently available on the market.

Although three specific combinations or embodiments have been shown and described in the present application, it is obvious that various features of each embodiment may be readily interchanged to provide new and additional combinations. For example, the arrangements for supplying water to and from the water-jacket may readily be interchanged, the construction of the water-jacket and combustion chambers may be interchanged or the specific type of filter medium may be interchanged without affecting the scope of the present invention. It is also contemplated that other types of heating units, including an electric treating arrangement, could be utilized instead of the specific burner disclosed in the present application and that the heating chamber would be modified to accommodate a different type of heating unit.

Therefore, while the invention is particularly shown and described with reference to preferred embodiments thereof, it will be understood by those in the art that foregoing and other changes in form and details may be made therein without departing from the spirit and scope of the invention.

What is claimed is:

1. A combined filtering and heating apparatus comprising heating chamber means, water-jacket means substantially surrounding said heating chamber means, filter means mounted on said heating chamber means, heating means in said heating chamber means for heating water in said filter means and said water-jacket means, supply conduit means for supplying water from a source to said filter means, additional conduit means for supplying water to said water-jacket means and return conduit means for returning heated water from said filter means and said water-jacket means to said source.

2. A combined filtering and heating apparatus as set forth in claim 1 wherein said heating chamber means and said water-jacket means have a substantially cylindrical configuration and said filter means is comprised of a substantially cylindrical filter section mounted on top of said heating chamber and further comprising flue means disposed in communication with said heating chamber means and extending upwardly through said filter section to provide additional heat transfer to the water in said filter means.

3. A combined filtering and heating apparatus as set forth in claim 2 wherein said additional conduit means is disposed relative to said supply conduit means to divert a portion of the water being supplied thereby to said water-jacket means without being filtered.

4. A combined filtering and heating apparatus as set forth in claim 3 wherein said filter section is adapted to be substantially filled with particulate matter and said supply conduit means is provided with a fluid distributing head disposed above the surface of said particulate matter adjacent the top of said filter section, said additional conduit means extending into the space above said particulate matter whereby a portion of the water supply to said filter section will be diverted through said additional conduit means to said water-jacket means and said return conduit means including fluid collecting means adapted to be disposed in said particulate filter medium adjacent the bottom of said filter section.

5. A combined filtering and heating apparatus as set forth in claim 2 wherein said return conduit means includes liquid collecting means disposed adjacent the bottom of said filter section comprising a plurality of conduits extending radially outwardly from a centrally disposed collector hub, a plurality of vertically extending hollow fittings spaced from each other on and disposed in communication with the interior of each of said conduits, said fittings being adapted to support elongated hollow filter cartridge means parallel to and spaced from said flues.

6. A combined filtering and heating apparatus as set forth in claim 5 wherein said additional conduit means is comprised of a T-shaped conduit fitting connected in said return conduit means so that the warm filtered water from said filter section passes through the conduit defining the cross bar of said T-shaped fitting, the conduit defining the perpendicular stem of said T-shaped conduit fitting being connected to said water-jacket means and plate means dividing the conduit defining the stem into two conduits and extending partially into the conduit defining the cross bar to divert a portion of the warm filtered water into the water-jacket means.

7. A combined filtering and heating apparatus as set forth in claim 2 further comprising foraminous basket means concentrically secured within said cylindrical filter section, said basket means including means for supporting a filter bag in said basket means and means for connecting said supply conduit means directly into said basket means.

8. A combined filtering and heating apparatus as set forth in claim 7 wherein said additional conduit means is comprised of a T-shaped conduit fitting connected in said return conduit means so that the warm filtered water from said filter section passes through the conduit defining the cross bar of T-shaped fitting, the conduit defining the perpendicular stem of said T-shaped conduit fitting being connected to said water-jacket means and plate means dividing the conduit defining the stem into two conduits and extending partially into the conduit defining the cross bar to divert a portion of the warm filtered water into the water-jacket means.

* * * * *